United States Patent [19]

Shearer et al.

[11] 4,312,280

[45] Jan. 26, 1982

[54] METHOD OF INCREASING THE SULFATION CAPACITY OF ALKALINE EARTH SORBENTS

[75] Inventors: John A. Shearer, Chicago; Clarence B. Turner, Shorewood; Irving Johnson, Clarendon Hills, all of Ill.

[73] Assignee: The United States of America as represented by the United States Department of Energy, Washington, D.C.

[21] Appl. No.: 129,932

[22] Filed: Mar. 13, 1980

[51] Int. Cl.³ .................................................. F23D 1/00
[52] U.S. Cl. .................................... 110/347; 110/342; 110/345; 110/263; 252/411 S
[58] Field of Search ............... 110/342, 343, 344, 345, 110/263, 347; 252/411 S

[56] References Cited

U.S. PATENT DOCUMENTS 3,966,431   6/1976   Craig et al. ..................... 110/342 X
4,212,851   7/1980   Nemeth et al. .................. 252/411 S Primary Examiner—Edward G. Favors
Attorney, Agent, or Firm—Hugh W. Glenn; Robert J. Fisher; Richard G. Besha

[57] ABSTRACT

A system and method for increasing the sulfation capacity of alkaline earth carbonates to scrub sulfur dioxide produced during the fluidized bed combustion of coal in which partially sulfated alkaline earth carbonates are hydrated in a fluidized bed to crack the sulfate coating and convert the alkaline earth oxide to the hydroxide. Subsequent dehydration of the sulfate-hydroxide to a sulfate-oxide particle produces particles having larger pore size, increased porosity, decreased grain size and additional sulfation capacity. A continuous process is disclosed.

24 Claims, 3 Drawing Figures

METHOD OF INCREASING THE SULFATION CAPACITY OF ALKALINE EARTH SORBENTS

CONTRACTUAL ORIGIN OF THE INVENTION

The invention described herein was made in the course of, or under, a contract with the UNITED STATES DEPARTMENT OF ENERGY.

BACKGROUND OF THE INVENTION

The present invention relates to a system and method of increasing the sulfation capacity of a sorbent and particularly to a system and method of increasing the sulfation capacity of limestone used to absorb sulfur dioxide produced during the combustion of coal in a fluidized bed combustor.

Removing pollutants from off gases is an important environmental consideration, and one method for removing or scrubbing unwanted sulfur dioxide from the flue gas or off gas produced during coal combustion is to contact same with an alkaline earth oxide for conversion thereof to the sulfate. As a result of the renewed interest in coal as a major energy source, considerable attention is being focused on the fluidized-bed combustion (FBC) of coal because the process offers potentially higher efficiency and lower capital cost than alternative processes. In the FBC process, crushed coal or other combustible material is burned at temperatures in the range of between about 700° C. and about 900° C. and at pressures in the range of between about 100 to 1000 kPa in a fluidized-bed of partially-sulfated, particulate, in situ sulfur dioxide sorbent such as limestone or dolomite. The bed material of limestone or dolomite transfers heat to the boiler tubes and reacts with and captures the potentially harmful sulfur dioxide released from the coal. Disadvantages of the process are the incomplete utilization of the calcium oxide in the calcined limestone which reacts with the sulfur dioxide present at elevated temperatures to form calcium sulfate with the resultant increase in the raw material cost and in the environmental impact of extensive quarrying and disposing of the large quantities of solid spent sorbent. Regeneration and reuse of spent limestone or dolomite, or alternatively an increase in the utilization of the available calcium oxide can reduce both the cost and environmental impact of this process.

Representative literature in the field includes the Strom et al U.S. Pat. No. 3,749,380 which discloses the use of a water slurry of calcium carbonate (5% solution) in a fluidized bed for reaction with sulfur dioxide gas. The reaction of calcium oxide and sulfur dioxide is not shown. The Robinson U.S. Pat. No. 3,751,227 discloses treatment of off gases with calcium carbonate particles wherein abrasive action of the particles removes the salt on the outside of the particles thereby exposing fresh calcium carbonate. The Wesselhoft et al U.S. Pat. No. 3,998,607 discloses an alkali metal catalyst useful in coal gasification and teaches the recovery thereof from reactor char by washing with water, thereby producing an alkali metal-rich aqueous solution. The Vogel et al U.S. Pat. No. 4,091,076 teaches the use of alkali metal or alkaline earth metal oxides impregnated with a refractory support material for use in the FBC process to scrub sulfur dioxide. Subsequent treatment of the sorbent material includes removal of the refractory support material and regeneration of the metal sulfate to the oxide by chemical reduction. The Hubble et al U.S. Pat. No. 4,081,522 teaches the regeneration of calcium sulfide formed during the fluidized-bed combustion of coal in the presence of limestone or dolomite. The material is subsequently reduced and treated with calcium sulfide to provide the requisite regeneration.

SUMMARY OF THE INVENTION

In view of the foregoing, it is a principal object of the present invention to provide an improved method and system for enhancing the sulfation capacity of alkaline earth metal carbonates.

The principal object of the present invention is to provide a method and system for enhancing the sulfation capacity of alkaline earth carbonates and particularly to provide a method and system adaptable to the continuous fluidized-bed combustion of coal which increases the sulfation capacity of limestone or dolomite used in the fluidized bed as a sorbent.

Another object of the present invention is to provide a method of increasing the sulfation capacity of particulate alkaline earth carbonates for reaction with sulfur dioxide comprising hydrating particles of alkaline earth oxide and alkaline earth sulfate produced during sulfation of the alkaline earth carbonate particles with sulfur dioxide at elevated temperatures to form particles of alkaline earth hydroxide and alkaline earth sulfate; and dehydrating the particles of alkaline earth hydroxide and alkaline earth sulfate at elevated temperatures to form particles of alkaline earth oxide and alkaline earth sulfate capable of additional sulfation upon contact with sulfur dioxide at suitable temperatures.

A still further object of the present invention is to provide a method of increasing the sulfation capacity of particulate calcium carbonate for reaction with sulfur dioxide comprising contacting the sulfur dioxide and the calcium carbonate particles at elevated temperatures in the range of from about 700° C. to about 900° C. to form particles of calcium oxide and calcium sulfate, hydrating the particles to form particles of calcium hydroxide and calcium sulfate, and dehydrating the particles of calcium hydroxide and calcium sulfate at elevated temperatures to form particles of calcium oxide and calcium sulfate capable of additional sulfation upon contact with sulfur dioxide at suitable temperatures.

Yet another object of the present invention is to provide a method of increasing the sulfation capacity of particulate calcium carbonates for reaction with sulfur dioxide produced during the combustion of sulfur-containing carbonaceous material, comprising forming a fluidized bed of the sulfur-containing carbonaceous material and calcium carbonate particles and maintaining same at a temperature in the range of between about 700° C. to about 900° C. to form therein particles of calcium oxide and calcium sulfate, removing at least some of the particles of calcium oxide and calcium sulfate and hydrating same to form particles of calcium hydroxide and calcium sulfate, and dehydrating the particles of calcium hydroxide and calcium sulfate at elevated temperatures in the fluidized bed to form particles of calcium oxide and calcium sulfate for additional sulfation upon contact with sulfur dioxide in the fluidized bed at elevated temperatures.

Yet another object of the present invention is to provide a system for increasing the sulfation capacity of particulate alkaline earth carbonates for reaction with sulfur dioxide comprising a hydrator, means for introducing particles of alkaline earth oxide and alkaline earth sulfate produced during the sulfation of the alkaline earth carbonate particles with sulfur dioxide into the hydrator, means for introducing water or steam or combinations thereof into the hydrator to form particles of alkaline earth hydroxide and alkaline earth sulfate, and means for dehydrating the particles of alkaline earth hydroxide and alkaline earth sulfate at elevated temperatures to form particles of alkaline earth oxide and alkaline earth sulfate capable of additional sulfation upon contact with sulfur dioxide at suitable temperatures.

A final object of the present invention is to provide a system comprising a fluidized-bed combustor means for introducing particulate sulfur-containing carbonaceous material and particulate calcium carbonates into the combustor and fluidizing same at elevated temperatures to form therein particles of calcium oxide and calcium sulfate, a fluidized bed hydrator, means for removing at least some of the particles of calcium oxide and calcium sulfate produced in the fluidized-bed combustor and introducing the particles into the fluidized bed hydrator, means for introducing water or steam or combinations thereof into the hydrator to form particles of calcium hydroxide and calcium sulfate, means for transporting particles of calcium hydroxide and calcium sulfate from the hydrator to the fluidized-bed combustor for dehydrating the particles of calcium hydroxide and calcium sulfate to form particles of calcium oxide and calcium sulfate capable of additional sulfation upon contact with sulfur dioxide.

These and other objects of the present invention may more readily be understood when taken in conjunction with the following specification and drawings, in which:

DESCRIPTION OF THE PREFERRED EMBODIMENT

Figure 1:
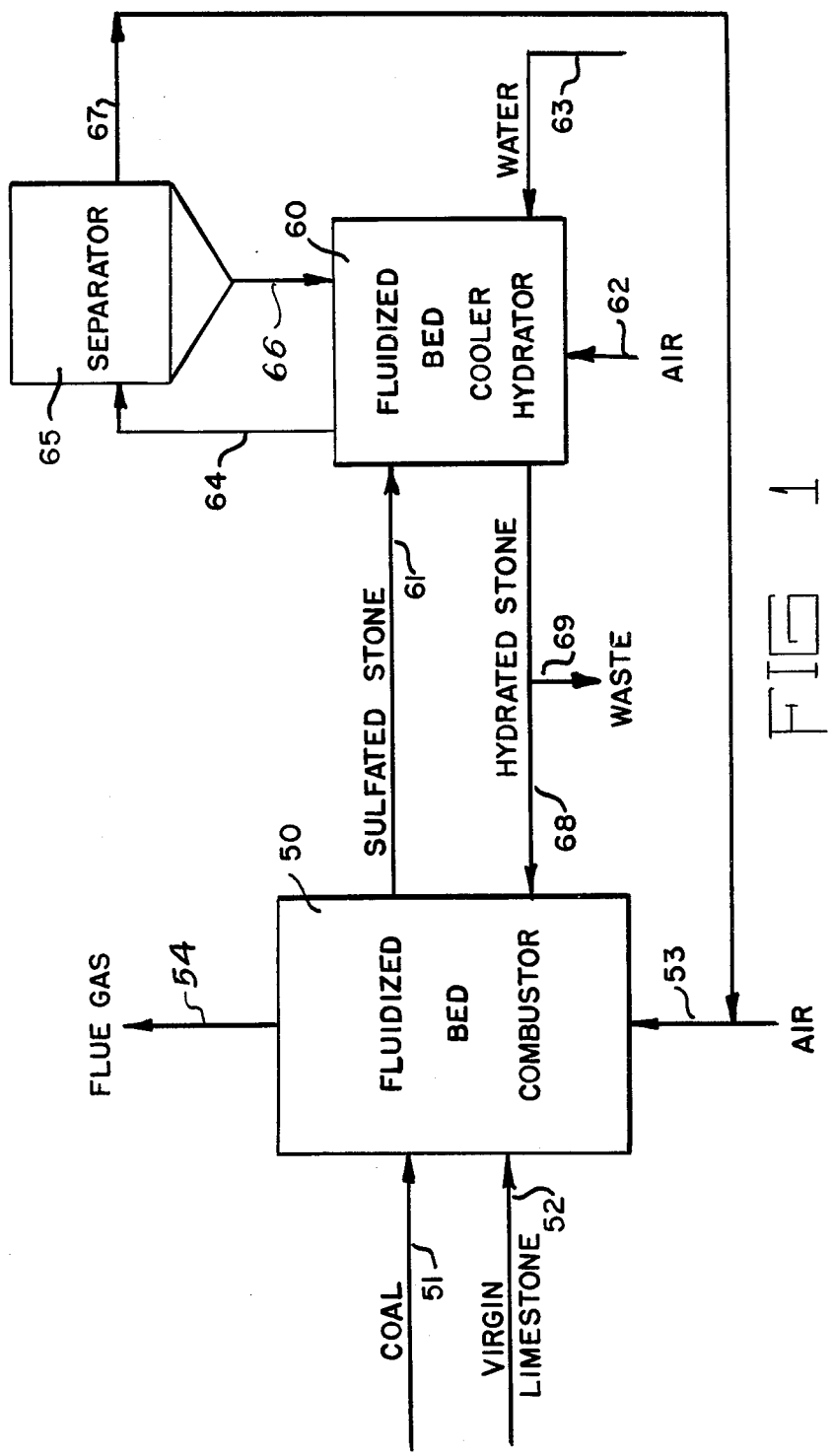
FIG. 1 is a schematic drawing of a system for the fluidized bed combustion of coal interconnected to a hydrator constructed in accordance with the system and operating in accordance to the method of the present invention.

The system and method of the present invention provides structure and process for altering the pore diameter and porosity and grain size and particle size of partially sulfated limestone or dolomite in order to make available additional calcium oxide for subsequent reaction with sulfur dioxide. In the process of fluidized bed combustion of coal, the active sorbent ingredient at the temperature there encountered, these being in the range of between about 700° C. and about 900° C., is calcium oxide, and for the purposes of discussion, calcium oxide will be treated as the reactive compound. On the other hand, where process temperatures are encountered in the range of about 300° C. to about 400° C. then magnesium oxide is capable of sulfation, thereby providing an additional active material. The invention is intended to cover both magnesium oxide and calcium oxide as active ingredients, although magnesium oxide does not sulfate at temperatures in the range of between about 700° C. and about 900° C., whereby in the discussion of a fluidized bed coal combustor the magnesium oxide is an inert material and will be so treated hereinafter.

In a fluidized-bed combustor, the calcium carbonate present in either limestone particles or dolomite particles is calcined to calcium oxide which reacts with the sulfur dioxide produced during the combustion of coal to form particles which contain calcium oxide on the inside covered by a coating of calcium sulfate. After the calcium sulfate has been formed further contact with sulfur dioxide produces little if any subsequent reaction.

It has been discovered, however, that treatment of the partially sulfated limestone or dolomite particles with water followed by reintroduction to the combustor as additional feedstock results in further sulfation of the water treated material. The key to the method and system of the present invention which makes it economically attractive is that the partially sulfated limestone can be hydrated at sufficiently high temperatures such that substantial heat losses are not encountered and the resulting product is one which can be handled without expensive equipment or further treatment, other than air drying, and reintroduced into the combustor along with fresh limestone or dolomite such that a continuous process is economically feasible.

Previous research showed that hydrate of lime is a highly reactive species for sulfur dioxide sorption; however, the economics of producing calcium hydroxide in combination with the problems of handling hydrated lime and the attrition and elutriation of soft calcium hydroxide made its use as a sorbent impracticable. The handling problems previously encountered with hydrated lime and the attrition and elutriation problems previously encountered with soft calcium hydroxide do not occur when the calcium hydroxide is produced by the hydration of partially sulfated limestones or dolomites which produces a material with sufficient physical integrity as well as high reactivity after calcining to make a suitable sorbent feed material in fluidized bed coal combustors.

Referring now to FIG. 1, there is illustrated a system in accordance with the present invention wherein a fluidized bed coal combustor 50 is provided via line 51 with feedstock of pulverized coal and via line 52 pulverized virgin limestone or dolomite. Air is introduced into the bottom of a combustor 50 through a line 53 and used to produce a fluidized bed within the combustor 50 as well as to provide a source of oxygen for the combustion of coal. Screens, distributors, heaters and the like are not illustrated, but are included, as is well known in the art, in the actual equipment combustor 50, as are flow meters, therocouples, valves and the like. Flue gas exit the combustor 50 at the top thereof through line 54 and are transported for further treatment or exhaustion to the atmosphere.

A fluidized bed cooler-hydrator 60 is provided and receives a continuous supply of partially sulfated particulate limestone removed from the fluidized bed combustor 50 and introduced into the hydrator 60 through a line 61. The sulfated limestone is fluidized in the hydrator 60 by means of air introduced through a line 62 and simultaneously is hydrated by the introduction of water through line 63 into the fluidized bed. Water may be added in the form of a spray, a mist or in the form of steam commingled with the air entering the hydrator 60 through the line 62 or any combination thereof. In any event, during the hydration of the partially sulfated stone in the hydrator 60, some of the calcium oxide inside the stone is hydrated to calcium hydroxide followed by a certain amount of decrepitation of the limestone. Fines generally of the size to pass through a 200 mesh screen as a result of the decrepitation of the limestone will exit the hydrator 60 through line 64 into a cyclone separator 65 or the like which separates the fines from the air steam and returns the fines through line 66 to the hydrator 60. The air or combination of air and steam leaving the cyclone separator 65 is recycled to the air inlet 53 of the fluidized-bed combustor 50.

The hydrated limestone or dolomite from the hydrator 60 exits through a line 68 and is recycled to the fluidized-bed combustor 50 either as a separate line as indicated in the flow sheet or is commingled with the virgin limestone introduced through line 52. A percentage of the hydrated limestone leaving the hydrator 60 may be discarded as waste via line 69.

The foregoing is a description of a method and system for practice of the present invention and particularly discloses a continuous process in which hydrated partially-sulfated limestone or dolomite in which is present some calcium hydroxide is reintroduced into a fluidized-bed combustor 50 and there simultaneously calcined to convert the calcium hydroxide to calcium oxide and simultaneously sulfated by contact of the calcium oxide with sulfur dioxide to provide a reactive sorbent for the sulfur dioxide produced during the combustion of coal.

Figure 2:
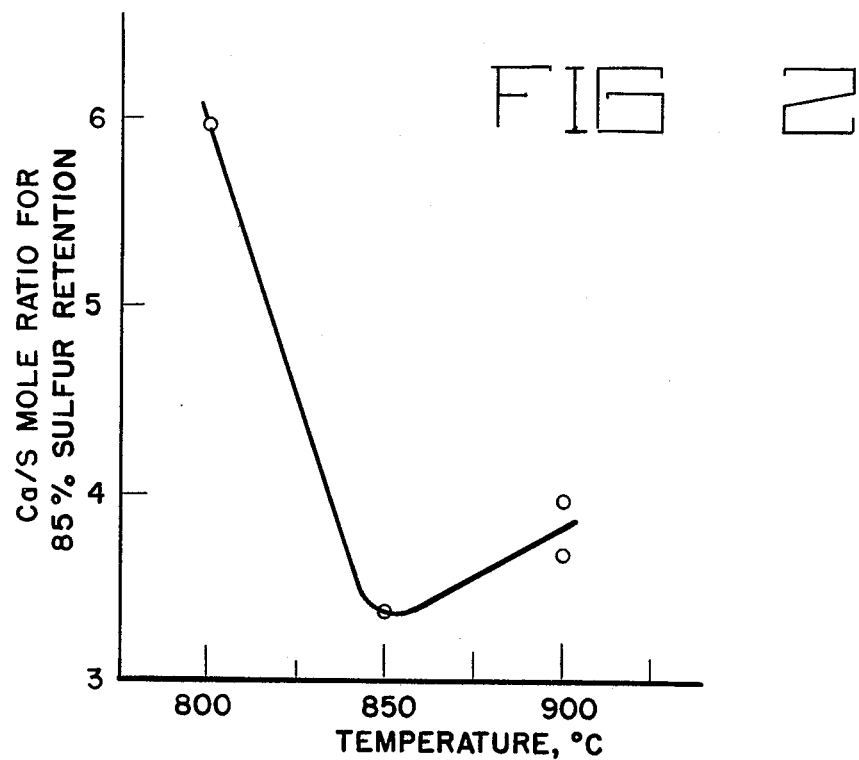
FIG. 2 is a graphical representation of the relationship between the calcium to sulfur mole ratio and temperature during the fluidized-bed combustion of coal and limestone.

FIG. 2 is a graphical illustration of the relationship between the calcium to sulfur mole ratio for steady state 85% sulfur retention in a fluidized-bed combustor as a function of combustion temperature. Sewickley coal, 5.46% sulfur, and Grove limestone sorbent, 95.3% $CaCO_3$ was used. There is a definite peak at 850° C. wherein an advantageous ratio of calcium to sulfur occurs, and to provide a process wherein the least amount of sorbent material is required the combustor 50 will be operated at a temperature as close to 850° C. as possible; however, the broad operating range is between about 700° C. and about 900° C.

The hydrator 60 must be operated at a temperature below the disassociation temperature of the alkaline earth hydroxide present in the hydrator, which in the case of calcium hydroxide is about 580° C. It has been found that particles hydrated at temperatures of about 100° C. exhibit greater subsequent sulfation capacity than those particles hydrated at higher temperatures around 500° C.; however, a trade-off must be made between the improved sulfation capacity of limestone hydrated at the low temperatures and the cost of cooling the limestone from the operating temperatures of the combustor 50 followed by reheating in the combustor 50, which trade-off generally results in the hydrator 60 being operated at a temperature of about 200° C. to 500° C.

Laboratory sulfation-hydration procedures were carried out in a tube furnace horizontally positioned. A simulated flue gas containing 0.3% by volume sulfur dioxide, 5% by volume oxygen, 20% by volume carbon dioxide and the balance nitrogen was flowed over a charge of dolomite or limestone. The resultant partially-sulfated sorbent was sprayed with a fine mist of water in sufficient quantities at room temperature to hydrate all of the available calcium oxide. In general, the sorbent gained between 4 to 15% by weight water due to the hydration. The actual water content was determined by measuring the weight loss of samples heated to 850° C. for 15 minutes. Subsequently, the sorbent was air dried at ambient temperatures, precalcined at about 850° C. and resulfated or alternatively simultaneously dehydrated and resulfated followed by chemical analysis to determine the extent of sulfation and examined in a scanning electron microscope.

Pore distribution was measured with a mercury porosimeter and the extent of decrepitation due to hydration was visually recorded prior to resulfation. The results of these laboratory runs are reported in Table I, the first two numbers of the dolomite or limestone samples referring to the percent of calcium carbonate in the as received stone. Initial sulfation was conducted for six hours with the aforementioned simulated flue gas and the resulfation was for an additional six hour period using the same simulated flue gas. The notations under the heading "Decrepitation" refers to the amount of fines produced, not the particle size. The original limestone or dolomite was particulate matter in the order of 18 to 20 mesh, whereas the fines produced by the water hydration and subsequent calcining step (Decrepitation) were 200 mesh.

TABLE I

Enchancement of the Sulfur Retention of Various Limestones and Dolomites by Hydration Treatment (Tube Furnace)[d]

Calcium Conversion to $CaSO_4$, % b

| Stone Identification,[a] ANL- | As Received Sorbents | Spent Sorbents[c] | |
|---|---|---|---|
| | | Single Water Treatment | Decrepitation |
| Limestone | | | |
| 7401 | 53.9 | 74.0 | Minor |
| 8001 (Greer) | 34.0 | 70.9 | Minor |
| 8701 | 39.2 | 76.3 | Medium |
| 8901 (1343) | 37.0 | 78.6 | Major |
| 9201 (1336) | 20.7 | 68.6 | Minor to Major |
| 9501 (Grove) | 13.6 | 74.6 | Minor |
| 9501 (AFBC Sample) | 26.0 | 63.7 | Minor |
| 9603 | 12.8 | 71.4 | Medium to Major |
| 9701 (Germany Valley) | 17.6 | 65.1 | Minor |
| Dolomite | | | |
| 5301 (Pfizer) | 95.7 | 100.0 | Minor |
| 5401 | 41.6 | 70.3 | Minor |
| 5501 | 30.5 | 56.7 | Minor |
| 5601 (Dolowhite) | 20.6 | 54.6 | Minor |
| 6101 | 68.5 | 100.0 | Minor |
| 6401 | 41.8 | 77.0 | Minor |
| Cyclic Hydrations | | Multiple Successive Water Treatments | |
| 5501 | 30.5 | 50.8, 69.1, 82.0, 94.9, 100 | |
| 5601 | 20.6 | 51.3, 62.8, 73.9, 86.4, 96.9 | |
| 9501 | 13.6 | 79.7, 92.5, 97.7 | |

[a]The first two digits refer to the nominal wt % of $CaCO_3$ in the as-received stone.
[b]% = (analyzed moles S analyzed moles Ca) × 100.
[c]Between 4 to 15 wt % water was added, followed by resulfation for 6 h at 850° C.
[d]One gram samples, 18–20 mesh particle size, sulfation for 6 h at 850° C.

The results shown in Table I illustrate a marked increase in the sulfation capacity for all sorbents studied. For example, limestone 7401 which had an initial reactivity that resulted in a 53.9% conversion of the available calcium oxide to calcium sulfate, after the water treatment, had a renewed activity which resulted in additional sulfation for a cumulative total of 74% conversion. Generally, stones having a lower calcium conversion benefitted most from the water treatment in terms of increased sulfation due thereto.

Also included in Table I were three runs in which a limestone and two dolomites were subjected to multiple successive hydration-sulfation cycles to determine the maximum utilization of the available calcium oxide. These data show that there is a potential for complete sulfation even in stones with the poorest initial reactivity.

A process development unit (PDU scale-atmospheric bed coal combustor having a 15.5 cm. internal diameter) was run with Grove limestone and a high sulfur coal, such as the Sewickley (−12+100 mesh) 5.46 weight percent sulfur. Each cycle was conducted as one long term run. The steady state operating conditions for this series of cyclic hydration-sulfation procedures are set forth below and the results of the procedures are set forth in Table II:
Temperature: 850° C.
Pressure: 101.3 kPa (1 atm)
Fluidizing-gas velocity: 1m/s
Fluidized bed height: 810 mm
Excess air: 3% $O_2$ in dry off-gas
Coal: Sewickley (1−12+100 mesh) 5.46% S
Sulfur retention 85%
Sulfur dioxide in dry off-gas: 680 to 715 ppm cycles, 15% by weight water was added to the products of the third cycle and 10% by weight water was added to the products of the fourth cycle. After each sulfation, hydration, and drying sequence, the material was sampled for analysis before being used as a feed for the next cycle.

In the steady state apparatus above described, a series of cyclic hydration-sulfation experiments was performed under conditions that approximated, as closely as possible, a continuous cycling system such as that illustrated in FIG. 1 and previously described.

The steady-state product composition and the available calcium to sulfur (Ca/S) mole ratio in the feed for each cycle are listed in Table II. The calcium/sulfur mole ratio provides an indication of the reactivity of the feed limestone. A decrease in the Ca/S mole ratio from the initial sulfation to the first hydration cycle indicates that the reactivity of the available calcium increased, presumably because of the initial need to calcine the calcium carbonate to calcium oxide and due to the structural changes caused by the water treatment. For the water treated sorbents, a nominal Ca/S mole ratio of

TABLE 2

Enchancement of the Sulfur Retention of Grove Limestone (ANL-9501) by Cyclic Hydration Treatments (Fluidized-Bed Combustor

| Hydration Cycle | Sorbent | Available Ca in Feed,[a] wt % | Sorbent/Coal Wt Ratio in Feed | Ca/S Mole Ratio[b] in Feed | Product Composition[c] Ca,wt % | S,wt % | Calcium Conversion $CaSO_4$,[d] % |
|---|---|---|---|---|---|---|---|
| Initial Sulfation | As Received | 38.2 | 0.59 | 3.3 | 46.7 | 8.3 | 22 |
| 1 | Hydrated Initial Sulfation 10.4 wt % $H_2O$ | 30.6 | 0.47 | 2.1 | 32.1 | 12.7 | 49 |
| 2 | Hydrated Cycle 1 Product 6.4 wt % $H_2O$ | 15.3 | 0.90 | 2.0 | 26.5 | 14.3 | 68 |
| 3 | Hydrated Cycle 2 Product 4.2 wt % $H_2O$ | 8.3 | 1.31 | 1.6 | 24.1 | 15.3 | 79 |
| 4 | Hydrated Cycle 3 Product 3.8 wt % $H_2O$ | 4.8 | 2.98 | 2.1 | 23.3 | 16.1 | 86 |
| 5 | Hydrated Cycle 4 Product 1.1 wt % $H_2O$ | 3.1 | 8.40 | 3.9 | 24.1 | 16.8 | 87 |

[a](analyzed total grams Ca - analyzed grams Ca as $CaSO_4$)
[b](analyzed total moles Ca - analyzed moles Ca as $CaSO_4$)
[c]As chemically analyzed.
[d](analyzed moles S analyzed moles Ca) × 100.

In these procedures, the duration of the steady state run ranged from 85 hours for the initial sulfation of the virgin Grove limestone to two hours for the fifth cycle. The reason for the time decrease is that continual loss of limestone occurs during each of the cyclic sulfations and hydrations such that by the fifth cycle only sufficient material is available for a two hour run.

The sulfur dioxide levels in the dry off-gas correspond to a nominal 85% sulfur retention in the sorbent. For each cycle, a starting bed of 7 to 9 kg of the appropriate feed sorbent was first sulfated until the dry off-gas contained approximately 800 ppm sulfur dioxide. Then an additional bed equivalent of feed sorbent of approximately 9 kg was gradually fed to the combustor; during this time, the sulfur dioxide level and the off-gas reached a steady state level of 700 ppm. After each cycle, the steady-state bed overflow and the final bed products were mixed together, spray hydrated by hand and dried with heat lamps and forced air. Approximately 20% by weight distilled water was added to the products of the initial sulfation in the first two hydration 2 is sufficient to maintain a nominal concentration of 700 ppm, sulfur dioxide in the dry off-gas.

Figure 3:
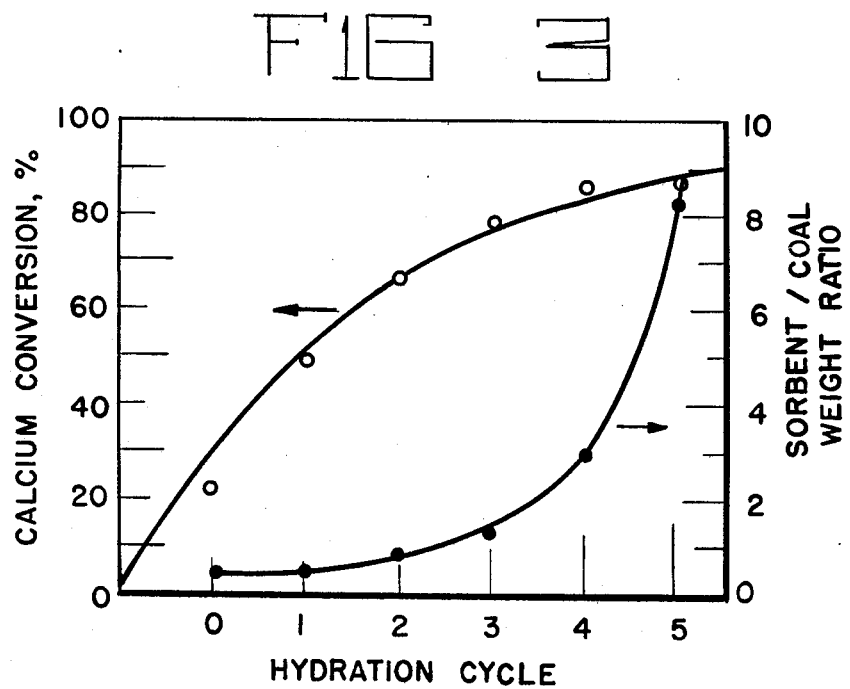
FIG. 3 is a graphical representation of the relationship between the calcium conversion to sulfate and the hydration cycle and the sorbent to coal weight ratio.

As indicated from Table II, after the fifth cycle a significant loss of reactivity of the available calcium occurred due primarily to a buildup of an impermeable layer of calcium sulfate and also possible as a result of sintering of the residual calcium oxide. The calcium conversion data of Table II are plotted in FIG. 3 which shows the relationship between calcium conversion and the hydration cycle for the steady state process. After the second cycle, 68% of the calcium had been utilized, and this is three times the calcium conversion experienced through initial sulfation, which was 22% utilization. Although after five cycles, the sulfated sorbent approached a maximum utilization of approximately 90%, a significant increase in the amount of sorbent was required, see FIG. 3. This is undesirable from a material balance view point and it is concluded that more than three hydration cycles is probably not economical.

The porosity and pore diameter measurements show that the porosity and pore diameter of the spent sorbent were increased dramatically with each successive hydration cycle. This type of pore structure alteration was also observed in both scanning electron microscopy and porosity measurements for all the hydration procedures performed. The development of more open pore structure apparently resulted in an increase in gas permeability. It is also believed that the sorbent particles expanded due to the formation and subsequent dehydration of calcium hydroxide, thereby accounting for the increase in average pore diameter and total porosity. The surface area contribution from large pores (greater than 0.3 microns) appeared to contribute greatly to sulfur capture without premature blockage by calcium sulfate. This increase in pore diameter and total porosity accounts for the increased sulfur capture.

Differential thermal analysis of materials from the cyclic procedures indicated that the water was preferentially bound as calcium hydroxide with virtually no formation of hydrates of calcium sulfate. Some dolomite samples showed small amounts of sulfate hydrate and magnesium hydroxide, but still small compared with the amount of calcium hydroxide present. Scanning electron microscopy photographs of the hydrated feed materials indicated that the initial sulfate layer cracked, that is the calcium hydroxide crystals grew within the cracks and that there was no apparent recrystallization of the calcium sulfate.

It is believed, in considering the results of the tests performed to date, that when the sulfation of the dolomites or limestone proceeds to a point where further reaction with the sulfur dioxide from the coal ceases it is due to a buildup of a calcium sulfate layer on the outside of the particle, thereby preventing the sulfur dioxide gas reaching the available calcium oxide within the particle. Subsequent treatment with water partially hydrates the residual calcium oxide forming calcium hydroxide with a resultant expansion of the calcium oxide particles thereby cracking the surface layer of the calcium sulfate. Upon dehydration (as opposed to air drying of the hydrated particles for easier handling) of the calcium hydroxide to form calcium oxide, a completely new pore structure develops having a greater total porosity and much larger pore diameters than in untreated spent sorbent as well as smaller crystallite size. A resulting increase in gas permeability coupled with the increase in surface area of the finally crystalized calcium oxide permits further sulfation to occur upon exposure of the sorbent to the sulfur dioxidecontaining combustion gas. It is believed, but not certain, that the presence of a liquid phase in conjunction with dehydration at temperatures above 800° C. increases the ionic diffusion enhancing the recrystallization of the incipient forming calcium oxide simultaneously allowing pore growth to occur at high temperatures. Additionally, explosive dehydration may also account for some of the very large pore structures measured.

In general, it may be stated that the process and systems of the subject invention results in an increase of the porosity of partially sulfated limestone upon dehydration since the molar volume of calcium hydroxide is approximately twice that of calcium oxide. The average pore diameter increases with hydration followed by dehydration as a result of the recrystallization of the calcium oxide and the explosive escape of steam. The grain size decreases upon the recrystallization of calcium oxide from the calcium hydroxide. The surface area of the calcium oxide in the hydrated-dehydrated stone increases as an inherent result from the increase in total porosity, the decrease in grain size and the pore size distribution change. The sulfation capacity of the hydrated sorbent increases as a result of the more favorable pore distribution and the greater surface area. The particle size is both increased due to the expansion and to the molar volume of calcium hydroxide and also decreases due to the fines produced by the explosive release of steam. Generally decrepitation which is undesirable is much less in dolomites than in limestones due to the fact that the dolomites contain substantial quantities of magnesium oxide which is inert at the temperatures in a fluidized bed coal combustor.

From the foregoing, it will be apparent that there has been provided a method and system of increasing the sulfation capacity of dolomites or limestones useful for absorbing sulfur dioxide produced during the fluidized-bed combustion of coal. Although described particularly in combination with a fluidized bed coal combustor, it is apparent that the method and system is adaptable for use with systems operating at much lower temperatures wherein the magnesium oxide or other alkaline earth oxides will be reactive, and hence, the inventive method and system is not restricted to use with calcium-containing materials.

While there has been described what at present is considered to be the preferred embodiment of the present invention, it will be understood that various alterations and modifications may be made therein without departing from the true spirit and scope of the present invention, and it is intended to cover within the claims appended hereto all such alterations and modifications.

The embodiments of the invention in which an exclusive property or privilege is claimed are defined as follows:

1. A method of increasing the sulfation capacity of particulate alkaline earth carbonates for reaction with sulfur dioxide comprising hydrating particles of alkaline earth oxide and alkaline earth sulfate produced during sulfation of the alkaline earth carbonate particles with sulfur dioxide at elevated temperatures to form particles of alkaline earth hydroxide and alkaline earth sulfate; and dehydrating the particles of alkaline earth hydroxide and alkaline earth sulfate at elevated temperatures to form particles of alkaline earth oxide and alkaline earth sulfate capable of additional sulfation upon contact with sulfur dioxide at suitable temperatures.

2. The method of claim 1, wherein the alkaline earth carbonates are calcium carbonate, magnesium carbonate or mixtures thereof.

3. The method of claim 1, wherein hydration is at a temperature less than the lowest decomposition temperature of alkaline earth hydroxide present.

4. The method of claim 1, wherein the dehydration temperature is sufficient to cause spontaneous conversion of the alkaline earth hydroxides present to alkaline earth oxides.

5. A method of increasing the sulfation capacity of particulate calcium carbonate for reaction with sulfur dioxide comprising contacting the sulfur dioxide and the calcium carbonate particles at elevated temperatures in the range of from about 700° C. to about 900° C. to form particles of calcium oxide and calcium sulfate, hydrating said particles to form particles of calcium hydroxide and calcium sulfate and dehydrating the particles of calcium hydroxide and calcium sulfate at elevated temperatures to form particles of calcium oxide and calcium sulfate capable of additional sulfation upon contact with sulfur dioxide at suitable temperatures.

6. The method of claim 5, wherein the sulfur dioxide and calcium carbonate particles are contacted at temperatures in the range of between about 800° C. and about 900° C.

7. The method of claim 5, wherein the sulfur dioxide and the calcium carbonate particles are contacted at a temperature of about 850° C.

8. The method of claim 5, wherein particles of calcium oxide and calcium sulfate are hydrated with water or steam or combinations thereof.

9. The method of claim 5, wherein the particles of calcium oxide and calcium sulfate are hydrated at a temperature less than about 580° C.

10. The method of claim 5 and further comprising air drying the dehydrated particles of calcium hydroxide and calcium sulfate to provide an easy to handle material and thereafter dehydrating the dried particles to convert the calcium hydroxide present to calcium oxide.

11. A method of increasing the sulfation capacity of particulate calcium carbonates for reaction with sulfur dioxide produced during the combustion of sulfur-containing carbonaceous material, comprising forming a fluidized bed of the sulfur-containing carbonaceous material and calcium carbonate particles and maintaining same at a temperature in the range of between about 700° C. and about 900° C. to form therein particles of calcium oxide and calcium sulfate, removing at least some of the particles of calcium oxide and calcium sulfate and hydrating same to form particles of calcium hydroxide and calcium sulfate, and dehydrating the particles of calcium hydroxide and calcium sulfate at elevated temperatures in the fluidized bed to form particles of calcium oxide and calcium sulfate for additional sulfation upon contact with sulfur dioxide in the fluidized bed elevated temperatures.

12. The method of claim 11, wherein the carbonaceous material is coal.

13. The method of claim 11, wherein the fluidized bed of sulfur-containing carbonaceous material and calcium carbonate particles is maintained at a temperature of about 850° C.

14. The method of claim 11, wherein the particles of calcium oxide and calcium sulfate are hydrated at a temperature of less than about 580° C.

15. The method of claim 11, wherein portions of the particles of calcium oxide and calcium sulfate in the fluidized bed are continuously removed and hydrated and particles of calcium hydroxide and calcium sulfate are continuously introduced into the fluidized bed along with fresh calcium carbonate particles and carbonaceous material.

16. A system for increasing the sulfation capacity of particulate alkaline earth carbonate for reaction with sulfur dioxide comprising a hydrator, means for introducing particles of alkaline earth oxide and alkaline earth sulfate produced during the sulfation of the alkaline earth carbonate particles with sulfur dioxide into said hydrator, means for introducing water or steam into said hydrator to form particles of alkaline earth hydroxide and alkaline earth sulfate, and means for dehydrating the particles of alkaline earth hydroxide and alkaline earth sulfate at elevated temperatures to form particles of alkaline earth oxide and alkaline earth sulfate capable of additional sulfation upon contact with sulfur dioxide at suitable temperatures.

17. The system of claim 16 and further including means for maintaining a fluidized bed of particles of alkaline earth oxide and alkaline earth sulfate in said hydrator and introducing water or steam or mixtures thereof into the fluidized bed.

18. The system of claim 17, wherein the fluidizing medium is air or steam or mixtures thereof and at least some of said particles of alkaline earth oxide and alkaline earth sulfate are calcium oxide and calcium sulfate.

19. The system of claim 17 and further including means connected to said hydrator for collecting fines produced during the hydration of the particles of alkaline earth oxide and alkaline earth sulfate.

20. A system comprising a fluidized bed combustor, means for introducing particulate sulfur-containing carbonaceous material and particulate calcium carbonates into said combustor and fluidizing same at elevated temperatures to form therein particles of calcium oxide and calcium sulfate, a fluidized bed hydrator, means for removing at least some of the particles of calcium oxide and calcium sulfate produced in said fluidized bed combustor and introducing said particles into said fluidized bed hydrator, means for introducing water or steam or combinations thereof into said hydrator to form particles of calcium hydroxide and calcium sulfate, and means for transporting particles of calcium hydroxide and calcium sulfate from said hydrator to said fluidized bed combustor for dehydrating particles of calcium hydroxide and calcium sulfate to form particles of calcium oxide and calcium sulfate capable of additional sulfation upon contact with sulfur dioxide.

21. The system of claim 20, wherein the fluidized bed combustor is maintained at a temperature in the range of between about 800° C. and about 900° C. and is fluidized with air.

22. The system of claim 20, wherein the fluidized bed hydrator is operated at a temperature less than about 580° C. and is fluidized with air or steam or combinations thereof.

23. The system of claim 20 and further comprising means for air drying the hydrated particles of calcium hydroxide and calcium sulfate prior to introduction thereof into the fluidized bed combustor for dehydration to form particles of calcium oxide and calcium sulfate.

24. The system of claim 20 and further comprising means connected to said hydrator for trapping and collecting fines produced during the hydration of the particles of calcium oxide and calcium sulfate to produce particles of calcium hydroxide and calcium sulfate and means for transporting the collected fines to the fluidized bed combustor.

* * * * *